United States Patent
Kwon et al.

(10) Patent No.: US 10,661,637 B2
(45) Date of Patent: May 26, 2020

(54) APPARATUS FOR IMPROVING VEHICLE INTERNAL AIR

(71) Applicant: Hyundai Motor Company, Seoul (KR)

(72) Inventors: Dong Ho Kwon, Bonghwa-eup (KR); Dae Ig Jung, Suwon-si (KR); Keun Sig Lim, Yongin-si (KR); Gee Young Shin, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 339 days.

(21) Appl. No.: 15/375,568

(22) Filed: Dec. 12, 2016

(65) Prior Publication Data
US 2018/0072136 A1 Mar. 15, 2018

(30) Foreign Application Priority Data
Sep. 12, 2016 (KR) .................. 10-2016-0117113

(51) Int. Cl.
| | |
|---|---|
| *B01D 53/00* | (2006.01) |
| *B60H 3/00* | (2006.01) |
| *B03C 3/12* | (2006.01) |
| *B03C 3/36* | (2006.01) |
| *B03C 3/47* | (2006.01) |
| *B01D 53/32* | (2006.01) |

(Continued)

(52) U.S. Cl.
CPC ............ *B60H 3/0078* (2013.01); *B01D 53/32* (2013.01); *B03C 3/04* (2013.01); *B03C 3/08* (2013.01); *B03C 3/12* (2013.01); *B03C 3/32* (2013.01); *B03C 3/368* (2013.01); *B03C 3/41* (2013.01); *B03C 3/45* (2013.01); *B03C 3/47* (2013.01); *B03C 3/68* (2013.01); *B60H 1/008* (2013.01); *B60H 1/00764* (2013.01); *B60H 1/00849* (2013.01); *B60H 1/00864* (2013.01); *B60H 3/024* (2013.01); *F24F 3/166* (2013.01); *B03C 2201/24* (2013.01); *B03C 2201/30* (2013.01)

(58) Field of Classification Search
CPC .. B60H 3/0078; B60H 3/024; B60H 1/00764; B60H 1/008; B60H 1/00849; B60H 1/00864; B01D 53/32; B03C 3/04; B03C 3/08; B03C 3/12; B03C 3/32; B03C 3/368; B03C 3/41; B03C 3/45; B03C 3/47; B03C 3/68; B03C 2201/24; B03C 2201/30; F24F 3/166
USPC ............................................................ 96/19
See application file for complete search history.

(56) References Cited

U.S. PATENT DOCUMENTS

| | | | | |
|---|---|---|---|---|
| 5,946,923 A | * | 9/1999 | Samukawa | ........ B60H 1/00764 165/249 |
| 2005/0031503 A1 | * | 2/2005 | Fox | ............................ A61L 9/22 422/186.04 |
| 2008/0041138 A1 | * | 2/2008 | Marra | ..................... B60H 1/008 73/31.02 |

FOREIGN PATENT DOCUMENTS

| | | |
|---|---|---|
| KR | 20-0221965 | 2/2001 |
| KR | 10-0658277 | 12/2006 |

(Continued)

*Primary Examiner* — T. Bennett McKenzie
(74) *Attorney, Agent, or Firm* — Morgan, Lewis & Bockius LLP (57) ABSTRACT

An apparatus for improving vehicle internal air may include an air conditioner including an intake door for controlling introduction of external air into a vehicle; an electric dust collection filter to collect fine dust contained in air; and a control device to control operation of the electric dust collection filter and the intake door, based on information about a concentration of fine dust inside the vehicle, a concentration of fine dust outside the vehicle, and a vehicle speed.

10 Claims, 4 Drawing Sheets

(51) Int. Cl.
  *B03C 3/41* (2006.01)
  *B03C 3/08* (2006.01)
  *B03C 3/32* (2006.01)
  *F24F 3/16* (2006.01)
  *B60H 1/00* (2006.01)
  *B03C 3/04* (2006.01)
  *B03C 3/45* (2006.01)
  *B03C 3/68* (2006.01)
  *B60H 3/02* (2006.01)

(56) References Cited

FOREIGN PATENT DOCUMENTS

| | | |
|---|---|---|
| KR | 10-2009-0108215 A | 10/2009 |
| KR | 10-2016-0099311 | 8/2016 |

\* cited by examiner

APPARATUS FOR IMPROVING VEHICLE INTERNAL AIR

CROSS-REFERENCE TO RELATED APPLICATION

The present application claims priority to Korean Patent Application No. 10-2016-0117113 filed on Sep. 12, 2016, the entire contents of which is incorporated herein for all purposes by this reference.

BACKGROUND

Field of the Invention

The present invention relates to an apparatus for improving vehicle internal air. More particularly, it relates to an apparatus for improving vehicle internal air, which is capable of improving internal air quality and comfortability by efficiently removing fine dust within a vehicle.

Description of Related Art

In recent years, there is an increasing need for new technology related to the removal of fine dust within a vehicle due to an increase in social concerns about harmfulness of fine dust.

A vehicle interior is small and sealed, and hence is easily contaminated. If the polluted air in the vehicle is not periodically ventilated, interior air pollution is further increased because of fine dust and various contaminants introduced into the interior.

Meanwhile, a vehicle is equipped with an air conditioner in order to pleasantly maintain the temperature, humidity, and air clearness within the vehicle. When the air within the vehicle is required to ventilate while the vehicle travels, air should be introduced from the outside of the vehicle by traveling wind or using a blower.

The air conditioner includes an air filter for filtering dust introduced into the interior together with exterior air when air outside the vehicle is introduced into the interior. A nonwoven filter is mainly used as the air filter.

The nonwoven filter is used to physically filter dust contained in the exterior air introduced into the vehicle interior using nonwoven fabric. However, it is impossible to actively control dust removal performance, and it is difficult to filter fine dust having very small particles. For this reason, there is a limit to dust removal performance and efficiency.

In particular, when a vehicle travels at a high speed, a large amount of fine dust is introduced into the interior of the vehicle together with exterior air, and hence the inflow of dust is increased. For this reason, it is difficult to filter fine dust introduced into the vehicle interior using an existing nonwoven filter.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for improving vehicle internal air, which is capable of efficiently removing fine dust within a vehicle and improving internal air quality and comfortability in the vehicle using an electric dust collection filter instead of an existing nonwoven filter, by determining whether or not the introduction of external air to a vehicle internal is blocked, based on the concentration of fine dust inside the vehicle, the concentration of fine dust outside the vehicle, and vehicle speed information, and by controlling the operation mode of the electric dust collection filter.

In an exemplary embodiment, an apparatus for improving vehicle internal air includes an air conditioner including an intake door for controlling introduction of external air into a vehicle internal, an electric dust collection filter to collect fine dust contained in air, and a control device to control operation of the electric dust collection filter and the intake door, based on information about a concentration of fine dust inside a vehicle, a concentration of fine dust outside the vehicle, and a vehicle speed.

The control device may control the operation of the electric dust collection filter and the intake door, based on the concentration of fine dust inside the vehicle, the concentration of fine dust outside the vehicle, and the vehicle speed in this order, and may classify the concentration of fine dust inside the vehicle and the concentration of fine dust outside the vehicle into a plurality of levels according to a concentration value thereof. When the level of fine dust concentration is equal to or higher than a predetermined level, the control device may determine that it is necessary to block the introduction of external air.

When the level of concentration of fine dust inside the vehicle is equal to or higher than a minimum level required to block the introduction of external air, the control device may operate the intake door in an inside air mode to block the introduction of external air and simultaneously increase a voltage applied to the electric dust collection filter to increase dust collection performance of the electric dust collection filter.

After the control device allows the intake door to block the introduction of external air, the control device may increase the number of operation steps of a blower provided in the air conditioner to increase an inside air circulation speed, and may operate a cooling device provided in the air conditioner to prevent internal humidity from increasing due to the blockage of the introduction of external air.

When a concentration of ozone generated in the electric dust collection filter is equal to or higher than a reference concentration, the control device may allow a voltage applied to an electric charge part of the electric dust collection filter to return to a previous voltage that is a voltage before being increased.

When the level of internal fine dust concentration is a level in which it is unnecessary to block the introduction of external air into the vehicle internal, the control device may determine whether the level of external fine dust concentration is equal to or higher than a minimum level required to block the introduction of external air, and when the level of external fine dust concentration is a minimum level required to block the introduction of external air, the control device may determine whether the vehicle speed is equal to or higher than a reference speed.

When the vehicle speed is equal to or higher than the reference speed, the control device may operate the intake door in the inside air mode to block the introduction of external air, and maintain the voltage applied to the electric dust collection filter without change. In the instant case, the control device may operate a cooling device provided in the air conditioner to prevent internal humidity from increasing due to the blockage of the introduction of external air.

When the vehicle speed is lower than the reference speed, the control device may operate the intake door in an outside air mode to introduce external air, and simultaneously increase a voltage applied to the electric dust collection filter to increase dust collection performance of the electric dust collection filter.

When a concentration of ozone generated in the electric dust collection filter is equal to or higher than a reference concentration due to an increase in voltage applied to the electric dust collection filter, the control device may allow a voltage applied to an electric charge part of the electric dust collection filter to return to a previous voltage that is a voltage before being increased.

When the level of concentration of fine dust outside the vehicle is a level higher than the minimum level required to block the introduction of external air, the control device may operate the intake door in an inside air mode to block the introduction of external air and maintain a voltage applied to the electric dust collection filter without change.

In the instant case, the control device may operate a cooling device provided in the air conditioner to prevent internal humidity from increasing due to the blockage of the introduction of external air.

When the vehicle speed is equal to or higher than the reference speed, the control device may selectively operate the intake door in an outside air mode to introduce external air, based on dust collection performance of the electric dust collection filter.

When the level of concentration of fine dust outside the vehicle is a level higher than the minimum level required to block the introduction of external air, the control device may selectively operate the intake door in an outside air mode to introduce external air, based on dust collection performance of the electric dust collection filter, improving internal comfortability.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra. The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
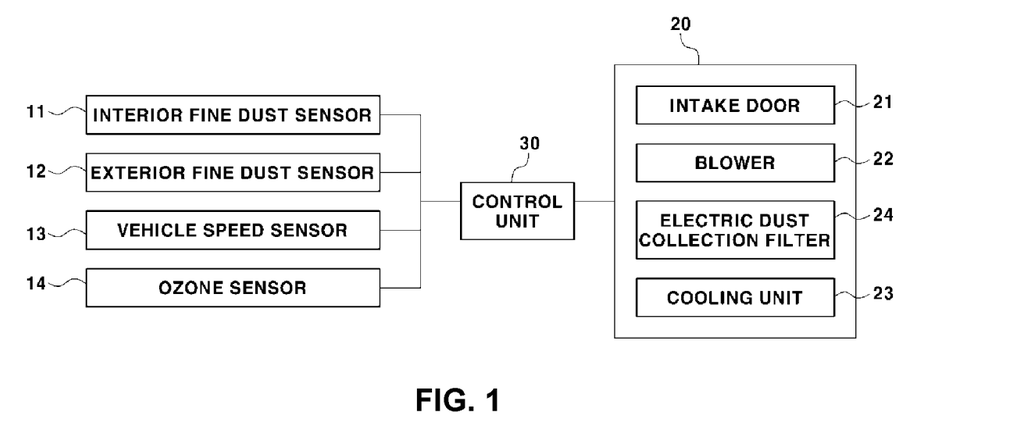
FIG. 1 is a block diagram illustrating the configuration of an apparatus for improving vehicle internal air according to an exemplary embodiment of the present invention.

As illustrated in FIG. 1, an apparatus for improving vehicle internal air according to an exemplary embodiment of the present invention includes an internal fine dust sensor 11 which detects the concentration of fine dust inside a vehicle, an external fine dust sensor 12 which detects the concentration of fine dust outside the vehicle, a vehicle speed sensor 13 for detecting a vehicle speed, an electric dust collection filter 24 which collects fine dust contained in air, and a control device 30 which controls the operation of an air conditioner 20 and the electric dust collection filter 24, based on the signals (fine dust concentration information) of the internal and external fine dust sensors 11 and 12 and the signal (vehicle speed information) of the vehicle speed sensor 13.

The internal fine dust sensor 11 is mounted in the vehicle to detect the concentration of fine dust inside the vehicle, and transmits the detected fine dust concentration information to the control device 30.

The external fine dust sensor 12 is mounted in the vehicle to detect the concentration of fine dust outside the vehicle, and transmits the detected fine dust concentration information to the control device 30.

The vehicle speed sensor 13 is mounted in the vehicle to detect the traveling speed of the vehicle, and transmits the detected vehicle speed information to the control device 30.

Figure 2:
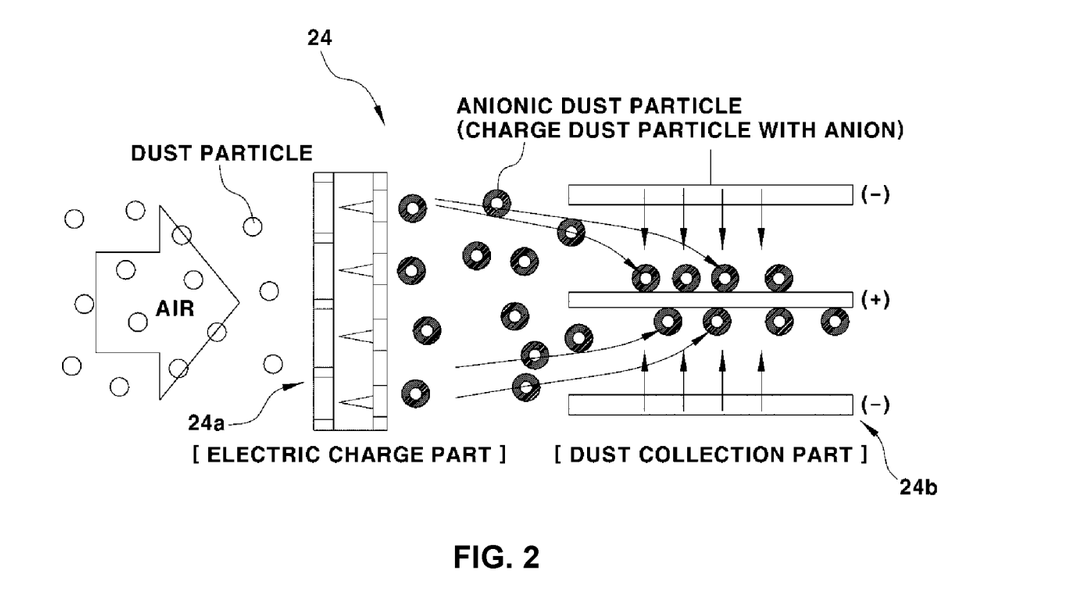
FIG. 2 is a view schematically illustrating the internal mechanism of an electric dust collection filter according to the exemplary embodiment of the present invention.

The electric dust collection filter 24 charges fine dust particles floating in air with electricity and then adsorbs the charged fine dust particles using electric force. The electric dust collection filter 24 forms an electric field in the air through which the charged fine dust particles pass, to pull and collect the fine dust particles. For example, the electric dust collection filter 24 may include an electric charge part 24a which charges fine dust particles contained in air with electricity, and a dust collection part 24b which collects the fine dust particles charged by the electric charge part 24a using electric force.

Since the dust collection performance and efficiency of the electric dust collection filter 24 vary according to the driving voltage applied to the electric charge part 24a and the dust collection part 24b, it is possible to control the dust collection performance and efficiency to a desired level by adjusting the applied voltage.

When the voltage applied to the electric charge part 24a and the dust collection part 24b is increased, the dust collection efficiency of the electric dust collection filter 24 is increased. When the voltage applied to the electric charge part 24a and the dust collection part 24b is decreased, the dust collection efficiency of the electric dust collection filter 24 is decreased.

Accordingly, it is possible to efficiently reduce the concentration of fine dust introduced into the vehicle internal by adjusting the voltage applied to the electric charge part 24a and the dust collection part 24b according to the vehicle speed.

The amount of external air introduced into the vehicle internal through the air conditioner 20 varies according to the vehicle speed, and thus the amount of fine dust introduced into the vehicle internal varies. Therefore, when the vehicle travels at a speed equal to or higher than a predetermined reference speed, a relatively high voltage is applied to the electric charge part 24a and the dust collection part 24b by increasing the voltage applied thereto. On the other hand, when the vehicle travels at a speed lower than the reference speed, a relatively low voltage is applied to the electric charge part 24a and the dust collection part 24b by decreasing the voltage applied thereto. Consequently, it is possible to efficiently collect and remove fine dust in response to variation in inflow of internal fine dust varying according to the vehicle speed.

The electric dust collection filter 24 is mounted in an internal passage (or a duct) for air flow in the air conditioner 20. For example, the electric dust collection filter 24 may be disposed at a position in which an existing air filter is mounted, and collects fine dust floating in the air introduced into the air conditioner 20 by traveling wind and/or a blower 22.

In other words, the electric dust collection filter 24 is mounted in the air conditioner 20 to collect fine dust in the air introduced into the air conditioner 20 before the fine dust is discharged to the vehicle internal.

The air conditioner 20 is a system for air conditioning in the vehicle, and serves to properly maintain the temperature and humidity in the vehicle and to ventilate internal air. the air conditioner 20 includes an intake door 21 for opening or closing a suction hole provided in the air conditioner 20, a blower 22 for drawing and discharging air, a cooling device 23 for cooling air within the vehicle, etc.

The intake door 21 is mounted at a predetermined position in the air conditioner 20 to determine and control the introduction of external air. When the intake door 21 is closed, the introduction of external air is blocked by the air conditioner 20. In the instant case, the air conditioner 20 is operable in an inside air circulation mode. When the intake door 21 is opened, external air is introduced by the air conditioner 20. In the instant case, the air conditioner 20 is operable in an outside air introduction mode.

That is, the outside air introduction mode and the inside air circulation mode of the air conditioner 20 may be selectively switched by opening or closing the suction hole of the air conditioner 20 using the intake door 21.

When the air conditioner 20 is operated in the inside air circulation mode, the blower 22 is operated in the state in which the intake door 21 is closed, circulating the air in the vehicle. In the instant case, when the cooling device 23 is driven, it is possible to prevent moisture from occurring on the window due to a reduction in humidity within the vehicle.

In addition, when the air conditioner 20 is operated in the outside air introduction mode, the blower 22 is operated in the state in which the intake door 21 is opened, so that external air may be introduced in to the vehicle internal to ventilate internal air.

The blower 22 is configured to discharge the air introduced into the air conditioner 20 to the outside (vehicle internal) of the air conditioner 20.

Meanwhile, in the case where the control device 30 controls the operation of the air conditioner 20 including the electric dust collection filter 24, based on the signals of the internal and external fine dust sensors 11 and 12 and the signal of the vehicle speed sensor 13, the control device 30 controls the signal of the internal fine dust sensor 11, the signal of the external fine dust sensor 12, and the signal of the vehicle speed sensor 13 in this order.

Accordingly, when the signal (internal fine dust concentration information) of the internal fine dust sensor 11 is input to the control device 30, the control device 30 determines an air quality inside the vehicle based on the signal. When the air quality is poor, the air conditioner 20 is operated in the inside air circulation mode, and the electric dust collection filter 24 is simultaneously operated, reducing internal fine dust concentration. When the air quality is not poor, the control device 30 determines an air quality outside the vehicle based on the signal (external fine dust concentration information) of the external fine dust sensor 12.

When the air quality outside the vehicle is not poor, the control device 30 controls the operation of the air conditioner 20 including the electric dust collection filter 24, based on the signal (vehicle speed information) of the vehicle speed sensor 13.

To determine an air quality according to a fine dust concentration when the signals of the internal and external fine dust sensors 11 and 12 are input to the control device 30, a level according to a fine dust concentration is set and stored in the control device 30.

The concentration value of fine dust inside and outside the vehicle is classified into three levels or more in a suitable range in the control device 30. Accordingly, the level of fine dust inside and outside the vehicle may be determined based on the signals of the internal and external fine dust sensors 11 and 12.

For example, the fine dust concentration level may be set as indicated by the following Table 1 according to high and low of a concentration value.

TABLE 1

| Classification | [unit: μg/m³] | | | |
| --- | --- | --- | --- | --- |
| | Good | Normal | Poor | Very Poor |
| PM 10 | 0~30 | 31~80 | 81~150 | 151~ |
| PM 2.5 | 0~15 | 16~50 | 51~100 | 101~ |

As indicated in the above Table 1, the level of fine dust concentration may be classified into a first level (good), a second level (normal), a third level (poor), and a fourth level (very poor). In the instant case, the range of fine dust concentration in each level is differently set according to the particle size of fine dust.

For example, the level of the concentration ($\mu g/m^3$) of fine dust having a particle diameter of 10 μm or less (PM 10) differs from the level of the concentration ($\mu g/m^3$) of fine dust having a particle diameter of 2.5 μm or less (PM 2.5) in the concentration range.

In the instant case, the level according to the fine dust concentration stored in the control device 30 may be properly changed and set according to the environments inside and outside the vehicle.

The control device 30 may be one of control units which are previously mounted in the vehicle, and may be, for example, a heater controller for controlling the air conditioner 20.

In addition, the control device 30 receives the signal of an ozone sensor 14 for detecting the concentration of ozone generated in the electric dust collection filter 24, and uses the signal to control the output of the electric dust collection filter 24.

Hereinafter, the process of improving vehicle internal air controlled by the control device 30 will be described with reference to FIG. 3.

Figure 3:
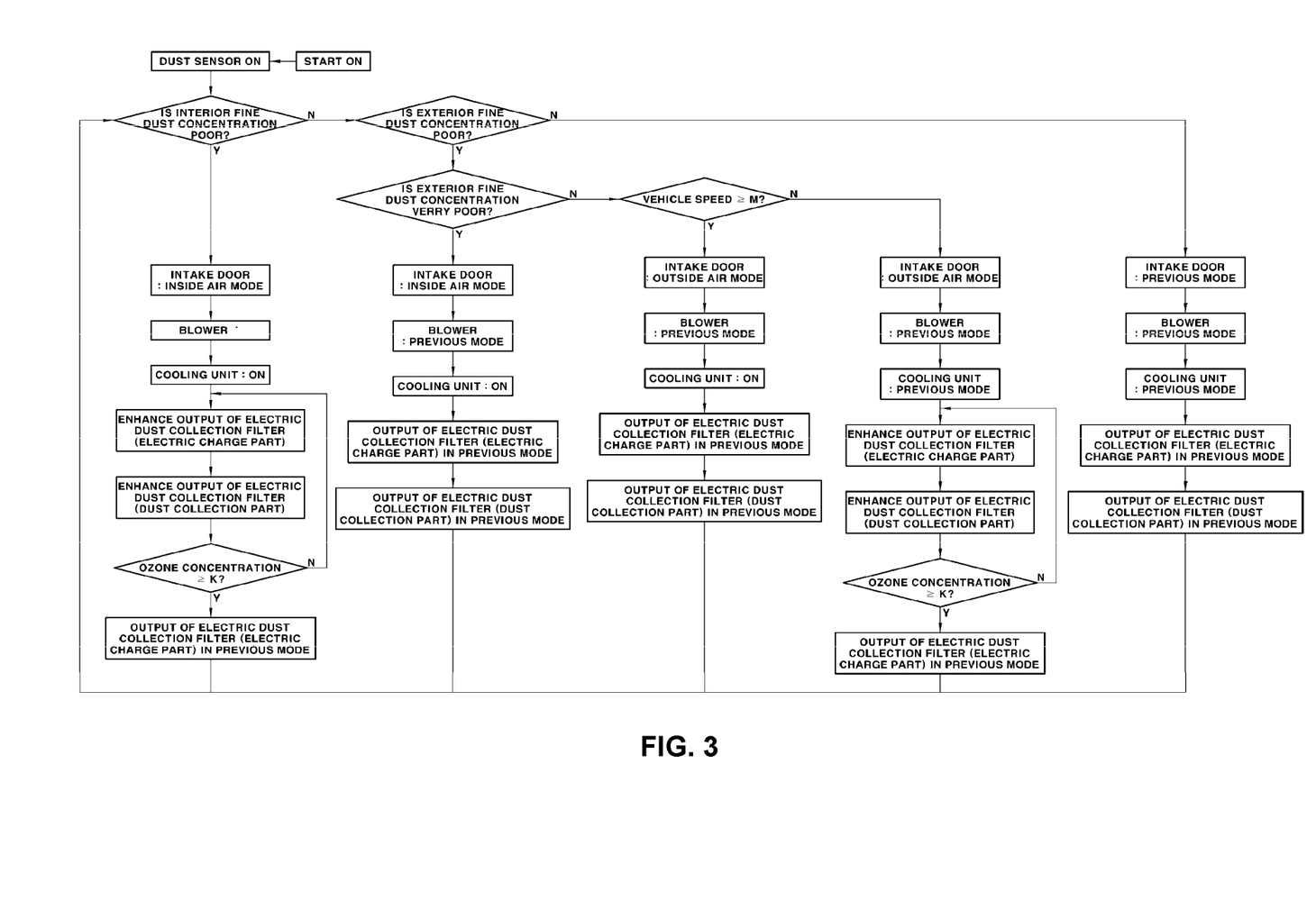
FIG. 3 is a flowchart illustrating a process of improving vehicle internal air according to an example of the present invention.

As illustrated in FIG. 3, when the internal and external fine dust sensors 11 and 12 are turned on in the state where the vehicle is started, and the fine dust concentration information is transmitted to the control device 30, the control device 30 first determines an air quality within the vehicle based on the internal fine dust concentration.

Here, among the fine dust concentration levels, the third level is a minimum level which is required to block the introduction of external air into the vehicle internal, and the fourth level is a higher level than the third level and a maximum level which is further required to block the introduction of external air into the vehicle internal compared to the third level. Therefore, the control device 30 determines that it is necessary to block the introduction of external air into the vehicle internal from the third level or higher.

That is, the control device 30 determines that it is necessary to block the introduction of external air when the level of fine dust concentration is equal to or higher than a predetermined level.

When the air quality according to the concentration of fine dust within the vehicle is in the third level (poor) or more, the control device 30 allows the air conditioner to enter the inside air circulation mode to block the introduction of external air and simultaneously increase the output (dust collection performance) of the electric dust collection filter 24. Consequently, it is possible to more efficiently collect fine dust contained in the air within the vehicle.

When the air conditioner 20 enters the inside air circulation mode, the air within the vehicle is circulated by the blower 22 in the state in which the intake door 21 closes the suction hole for the introduction of external air and the mode of the intake door is switched to an inside air mode. In the instant case, it is possible to relatively rapidly remove fine dust by increasing the number of operation steps of the blower 22 and the flow rate of air (that is, an inside air circulation speed) and thus by increasing the amount of air passing through the electric dust collection filter 24.

In the instant case, after the intake door 21 is fully closed and the introduction of external air is blocked, the number of operation steps of the blower 22 is preferably increased.

By operating the cooling device 23 and lowering the temperature in the vehicle when the air conditioner 20 enters the inside air circulation mode, the introduction of external air is blocked, preventing an increase in internal humidity.

That is, when the intake door 21 is fully closed and the introduction of external air is blocked, the humidity in the vehicle is increased. Therefore, the cooling device 23 is operated to lower the humidity.

In addition, when the cooling device 23 is operated, the dust in the air passing through the cooling device may be removed due to moisture generated by the heat of a heat exchanger provided in the cooling device 23, improving internal comfortability.

The electric dust collection filter 24 applies a high voltage to the electric charge part 24a and the dust collection part 24b by increasing the voltage applied thereto, enhancing dust collection performance. Thus, when the concentration of ozone generated in the electric dust collection filter 24 is increased and is equal to or higher than a reference concentration, a low voltage is applied to the electric charge part 24a by decreasing the voltage applied thereto, and the output (dust collection performance) of the electric dust collection filter 24 is returned to that in the previous mode.

Here, the reference concentration is set as a concentration value required to relieve/reduce the generation of ozone due to the excessive generation of ozone in the electric dust collection filter 24.

It is possible to increase the efficiency for removing internal fine dust by controlling the dust collection performance of the electric dust collection filter 24. Thus, it is possible to reduce frequency of the entrance of the air conditioner 20 to the inside air circulation mode.

Typically, the entrance of the air conditioner 20 to the inside air circulation mode is preferably minimized to improve the air quality within the vehicle.

Next, the process of determining that it is necessary to block the introduction of external air into the vehicle internal, based on the concentration of fine dust within the vehicle, is repeated again, and the control process described above may be repeated according to the result of determination.

Meanwhile, when the level of internal fine dust concentration is equal to or lower than the second level (normal), in which it is unnecessary to block the introduction of external air, as a result of determining the air quality within the vehicle based on the internal fine dust concentration, the control device 30 controls the operation of the air conditioner 20 and the electric dust collection filter 24, based on the external fine dust concentration.

When the level of external fine dust concentration is lower than the third level, namely is equal to or lower than the second level, the intake door 21, the blower 22, and the cooling device 23 are controlled to be maintained without change in the previous mode, and the electric dust collection filter 24 is controlled to be maintained without change in the previous mode.

In other words, when the level of external fine dust concentration is the first or second level in which it is unnecessary to block the introduction of external air into the air conditioner 20, the intake door 21, the blower 22, the cooling device 23, and the electric dust collection filter 24 are controlled to be maintained in the mode before the external air quality is determined on the basis of the level of external fine dust concentration.

For example, when the intake door 21 is in an outside air mode in which the suction hole of the air conditioner 20 is opened, the intake door is maintained in the outside air mode, and the dust collection performance of the electric dust collection filter 24 is maintained by uniformly maintaining the voltage applied to the electric charge part 24a and the dust collection part 24b.

When the level of internal fine dust concentration is a level in which it is unnecessary to block the introduction of external air and the level of external fine dust concentration is the third level in which it is necessary to block the introduction of external air, the control device controls the operation of the air conditioner 20 and the electric dust collection filter 24, based on the vehicle speed information. In the instant case, when the vehicle speed is equal to or higher than a predetermined reference vehicle speed, the control device determines that the vehicle travels at a high speed and allows the air conditioner 20 to enter the inside air circulation mode.

Here, the reference vehicle speed is set as a vehicle speed value in which the inflow of internal dust is excessive due to the traveling of the vehicle at a high speed.

Since the amount of fine dust introduced into the vehicle internal through the suction hole of the air conditioner 20 is relatively increased as the vehicle speed becomes high, the air conditioner 20 enters the inside air circulation mode to block the introduction of external air.

However, since the external fine dust concentration is in a poor level (third level) or the internal fine dust concentration is in a normal level (second level) or less, the mode of the intake door 21 is switched to the inside air mode so that the intake door 21 closes the suction hole of the air conditioner 20, and the blower 22 is controlled to be maintained in the previous mode (to maintain the previous number of operation steps).

In the instant case, when the cooling device 23 is turned on to prevent internal humidity from increasing, the electric dust collection filter 24 is controlled to be maintained in the previous operation mode by continuously maintaining the voltage applied to the electric charge part 24a and the dust collection part 24b.

In addition, when the level of internal fine dust concentration is a level in which it is unnecessary to block the introduction of external air, the level of external fine dust concentration is the third level, and the vehicle speed is lower than the reference vehicle speed, it is determined that the vehicle travels at a low speed in which the external fine dust concentration is high but the introduction of external air is relatively low. Therefore, the air conditioner 20 is operated in the outside air introduction mode and the voltage applied to the electric dust collection filter 24 is increased to a high voltage to enhance dust collection performance.

In the instant case, the intake door 21 is operated in the outside air mode to introduce external air through the air conditioner 20, and the blower 22 and the cooling device 23 are controlled to be maintained without change in the previous mode.

The control device detects variation in ozone concentration due to the increase of the voltage applied to the electric charge part 24a and the dust collection part 24b of the electric dust collection filter 24. When the ozone concentration is equal to or higher than a reference concentration K, only the voltage applied to the electric charge part 24a is returned to the previous level that is a voltage before being increased.

In the instant case, the voltage applied to the dust collection part 24b is maintained in an increased state, and only the voltage applied to the electric charge part 24a is returned, to prevent the dust collection performance of the electric dust collection filter 24 from decreasing or from returning to that in the previous mode (before the ozone concentration reaches the reference concentration).

Finally, when the level of internal fine dust concentration is the second level or less but the level of external fine dust concentration is the fourth level which is a maximum level, in other words when the internal air quality is good but the external air quality is very poor, the air conditioner 20 is controlled to enter the inside air circulation mode, and the electric dust collection filter 24 is controlled to maintain previous output (dust collection performance).

The intake door 21 is controlled to be operated in the inside air mode, the blower 22 is controlled to maintain the previous number of operation steps, and the electric dust collection filter 24 is controlled to maintain the same output (dust collection performance) by uniformly maintaining the voltage applied to the electric charge part 24a and the dust collection part 24b.

In the instant case, the cooling device 23 is operated to prevent internal humidity from increasing due to the blockage of the introduction of external air.

Meanwhile, as described above, it is necessary to prevent the air conditioner 20 from entering the inside air circulation mode, in which the introduction of external air is blocked, to improve the air quality within the vehicle.

Accordingly, it is possible to control the operation of the air conditioner 20 to minimize the entry of the air conditioner 20 into the inside air circulation mode, based on the dust collection performance of the electric dust collection filter 24. That is, it is possible to control the operation of the air conditioner 20 and the electric dust collection filter 24 according to the dust collection performance of the electric dust collection filter 24, as illustrated in FIG. 4 and FIG. 5.

The method of improving internal air using the general electric dust collection filter has been described above. FIG. 4 illustrates a method of improving internal air using an electric dust collection filter having high efficiency compared to the general electric dust collection filter. FIG. 5 illustrates a method of improving internal air using an electric dust collection filter having ultra-high efficiency compared to the general electric dust collection filter and the high-efficiency electric dust collection filter.

Figure 4:
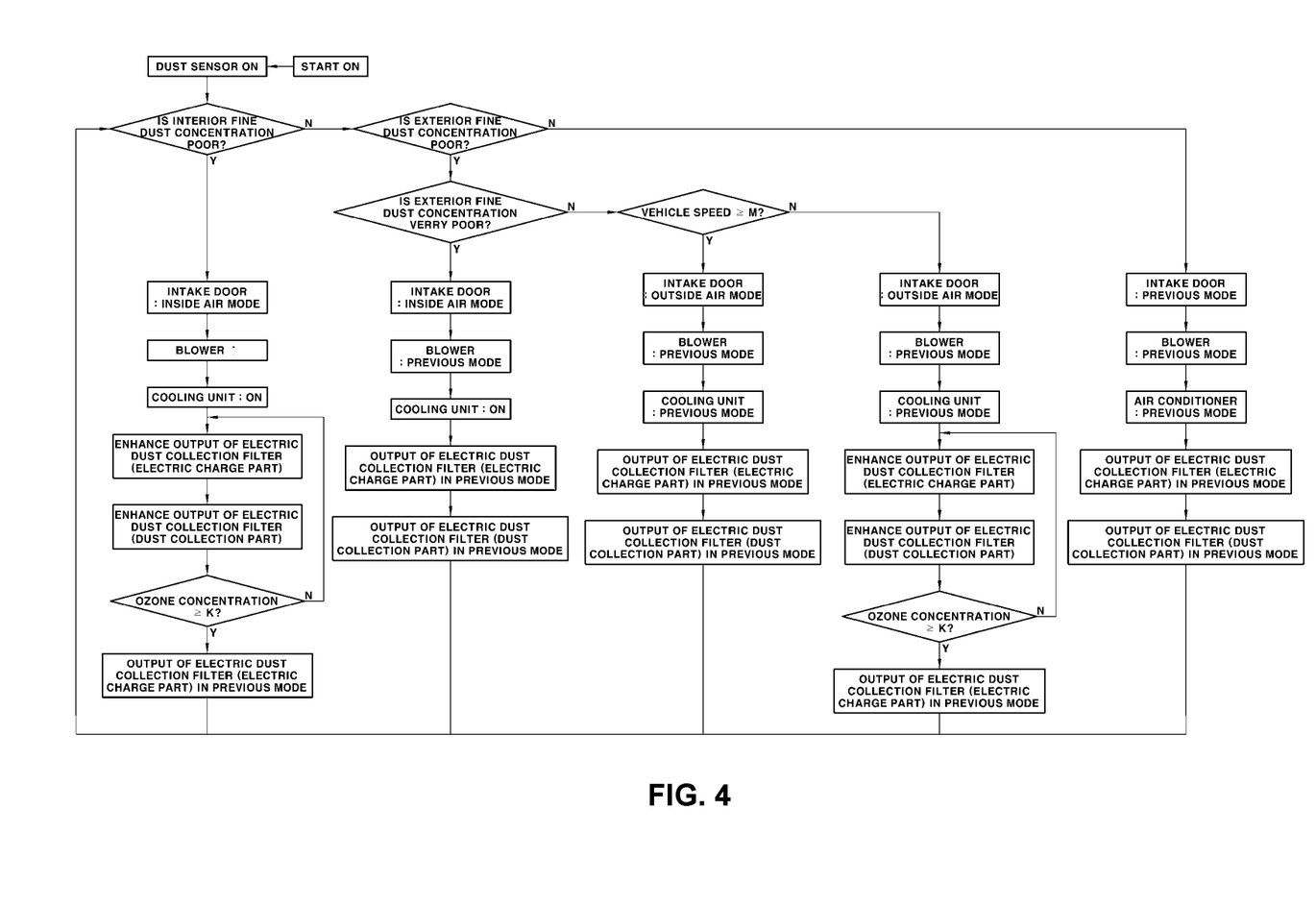
FIG. 4 is a flowchart illustrating a process of improving vehicle internal air according to another example of the present invention.
Figure 5:
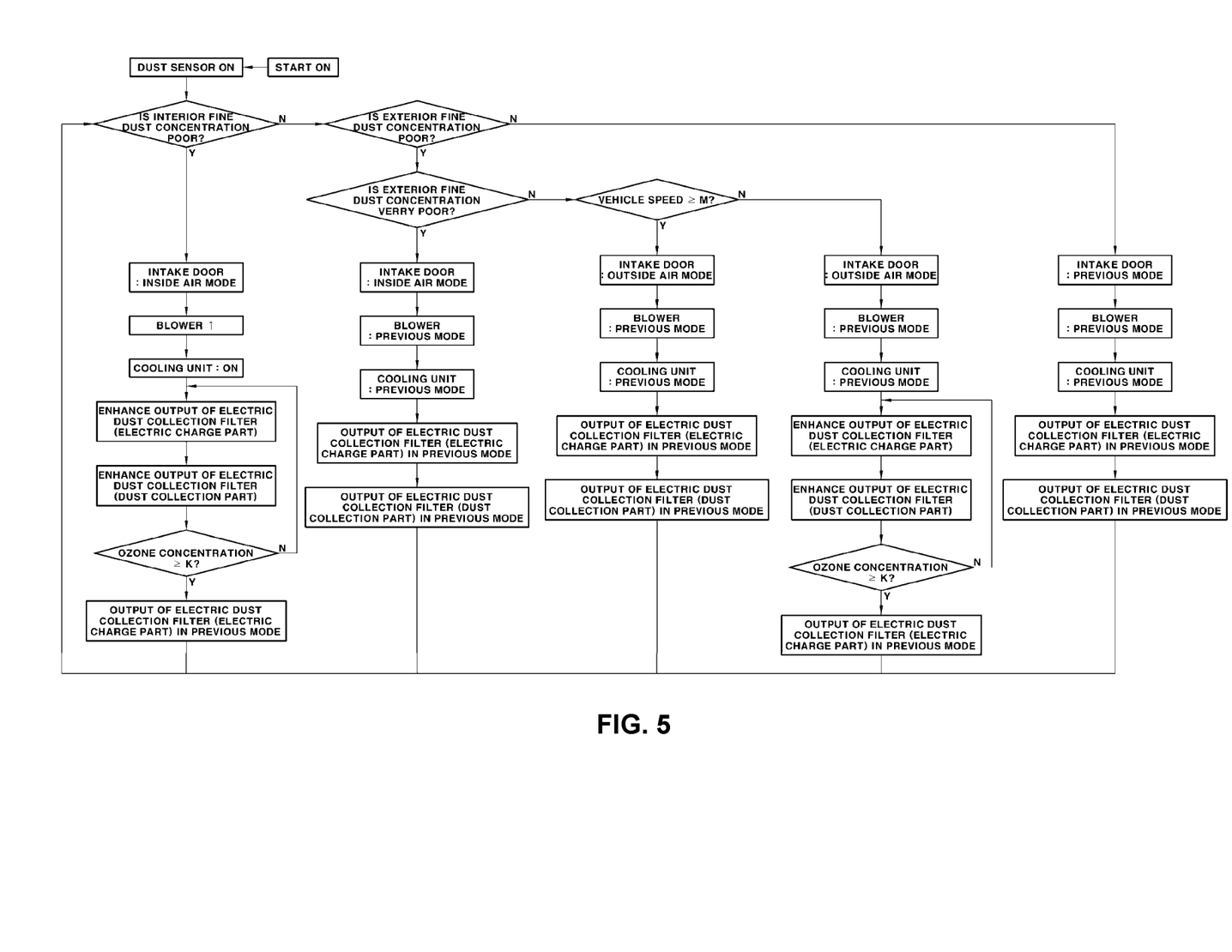
FIG. 5 is a flowchart illustrating a process of improving vehicle internal air according to a further example of the present invention.

First, in the high-efficiency electric dust collection filter having high dust collection performance compared to the general electric dust collection filter, as illustrated in FIG. 4, when the internal fine dust concentration is in the second level or less, the external fine dust concentration is in the third level, and the vehicle speed is equal to or higher than the reference speed, the air conditioner 20 may be controlled to be operated in the outside air introduction mode.

In such a case, the external fine dust concentration is in a poor state since the concentration is in a level in which it is necessary to block the introduction of external air into the vehicle internal. However, even though external air is introduced through the air conditioner 20 because of the high performance of the electric dust collection filter, the internal fine dust concentration may be preferably maintained and the deterioration of internal air quality may be prevented.

Next, in the ultra high-efficiency electric dust collection filter having very high dust collection performance compared to the general electric dust collection filter, as illustrated in FIG. 5, when the internal fine dust concentration is in the second level or less, the external fine dust concentration is in the third level, and the vehicle speed is equal to or higher than the reference speed, the air conditioner 20 may be controlled to be operated in the outside air introduction mode. In addition, even when the internal fine dust concentration is in the second level or less, and the external fine dust concentration is in the fourth level which is a maximum level, the air conditioner 20 may be controlled to be operated in the outside air introduction mode.

In such a case, the external fine dust concentration is in a very poor state since the concentration is in a level in which it is highly necessary to block the introduction of external air into the vehicle internal. However, since most of fine dust in the air introduced through the air conditioner 20 may be removed because of the good concentration of internal fine dust concentration and the high performance of the electric dust collection filter, it is possible to prevent internal air quality from deteriorating due to the introduction of external air.

As described above, when the air conditioner 20 is operated in the outside air introduction mode according to the performance of the electric dust collection filter 24, the cooling device 23 is controlled to be maintained in the previous mode.

When the electric dust collection filter 24 has high efficiency and very high efficiency performance and the internal fine dust concentration is in a good level, the air conditioner 20 may be selectively controlled to be operated in the outside air introduction mode, and thus internal air may be pleasantly improved.

As is apparent from the above description, in accordance with the apparatus for improving vehicle internal air, it is possible to efficiently remove fine dust within a vehicle and improve internal air quality and comfortability in the vehicle by determining whether or not the introduction of external air to a vehicle internal is blocked, in consideration of the concentration of fine dust inside/outside the vehicle and a vehicle speed affecting an amount of external air introduced into the vehicle internal, and by properly controlling the operation of an electric dust collection filter.

since the vehicle travels without the blockage of external air introduction by an air conditioner even in the condition that the concentration of fine dust outside the vehicle is high in consideration of the relatively reduction of the amount of external air introduced into the internal when the vehicle travels at a low speed, it is possible to secure comfortability in the vehicle.

In addition, when the vehicle travels in the state in which the introduction of external air to the vehicle internal is blocked, it is possible to prevent the humidity within the vehicle from increasing by driving a cooling device, and thus to prevent moisture from occurring on a window while the vehicle travels.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for improving vehicle internal air, the apparatus comprising:
   an air conditioner including an intake door for controlling introduction of external air into a vehicle;
   an electric dust collection filter to collect dust contained in air; and
   a control device to control operation of the electric dust collection filter and the intake door, based on information about a concentration of dust inside the vehicle, a concentration of dust outside the vehicle, and a vehicle speed,
   wherein the control device classifies the concentration of the dust inside the vehicle and the concentration of the dust outside the vehicle into a plurality of levels according to a concentration value thereof,
   wherein when a level of the concentration of the dust inside the vehicle is equal to or higher than a minimum level required to block the introduction of the external air, the control device operates the intake door in an inside air mode to block the introduction of the external air and simultaneously increases a voltage applied to the electric dust collection filter to increase dust collection performance of the electric dust collection filter,
   wherein when a concentration of ozone generated in the electric dust collection filter is equal to or higher than a reference concentration, the control device allows a voltage applied to an electric charge part of the electric dust collection filter to be returned to a previous voltage that is a voltage before being increased,
   wherein when the level of the concentration of the dust inside the vehicle is a level in which it is unnecessary to block the introduction of the external air into the vehicle, the control device is configured to determine whether a level of the concentration of the dust outside the vehicle is equal to or higher than a minimum level required to block the introduction of the external air, and when the level of the concentration of the dust outside the vehicle is the minimum level required to block the introduction of the external air, the control device is configured to determine whether the vehicle speed is equal to or higher than a reference speed, and
   wherein when the vehicle speed is, lower than the reference speed, the control device operates the intake door in an outside air mode to introduce the external air, and simultaneously increases the voltage applied to the electric duct collection filter to increase the dust collection performance of the electric dust collection filter.

2. The apparatus of claim 1, wherein the control device is configured to control the operation of the electric dust collection filter and the intake door, based on the concentration of the dust inside the vehicle, the concentration of the dust outside the vehicle, and the vehicle speed in sequence.

3. The apparatus of claim 1, wherein when a level of the concentration of the dusts is equal to or higher than a predetermined level, the control device is configured to determine that it is necessary to block the introduction of the external air into the vehicle.

4. The apparatus of claim 3, wherein after the control device allows the intake door to block the introduction of the external air, the control device increases a number of operation steps of a blower provided in the air conditioner to increase an inside air circulation speed.

5. The apparatus of claim 3, wherein when the control device operates the intake door in the inside air mode to block the introduction of the external air, the control device operates a cooling device provided in the air conditioner to prevent internal humidity from increasing.

6. The apparatus of claim 1, wherein when the vehicle speed is equal to or higher than the reference speed, the control device operates the intake door in the inside air mode to block the introduction of the external air, and maintains the voltage applied to the electric dust collection filter without change.

7. The apparatus of claim 6, wherein when the control device operates the intake door in the inside air mode to block the introduction of the external air, the control device operates a cooling device provided in the air conditioner to prevent internal humidity from increasing.

8. The apparatus of claim 1, wherein when the level of the concentration of the dust outside the vehicle is a level higher than the minimum level required to block the introduction of the external air, the control device operates the intake door in the inside air mode to block the introduction of the external air and maintains the voltage applied to the electric dust collection filter without change.

9. The apparatus of claim 8, wherein when the control device operates the intake door in the inside air mode to block the introduction of the external air, the control device operates a cooling device provided in the air conditioner to prevent internal humidity from increasing.

10. The apparatus of claim 1, wherein the electric dust collection filter is positioned in the air conditioner to collect the dust in air introduced into the air conditioner before the dust is discharged into the vehicle.

* * * * *